United States Patent [19]

James

[11] 3,910,437
[45] Oct. 7, 1975

[54] TAILGATE CONVEYOR
[75] Inventor: W. Thomas James, Canfield, Ohio
[73] Assignee: The Renner Company, Youngstown, Ohio
[22] Filed: Mar. 27, 1974
[21] Appl. No.: 455,514

Related U.S. Application Data
[63] Continuation-in-part of Ser. No. 289,631, Sept. 15, 1972, Pat. No. 3,804,278.

[52] U.S. Cl. .............. 214/509; 214/520; 214/83.32
[51] Int. Cl.² ........................................... B60P 1/40
[58] Field of Search .......... 214/520, 519, 521, 522, 214/83.32, 508, 509

[56] References Cited
UNITED STATES PATENTS
2,381,783  8/1945  Stevenson .......................... 214/509
2,490,212  12/1949  Davis ................................. 214/521
2,883,076  4/1959  Palmer ............................ 214/83.32
3,171,558  3/1965  Sharp .......................... 214/83.32 X
3,331,519  7/1967  Jenning, Jr. ....................... 214/509

Primary Examiner—Albert J. Makay
Attorney, Agent, or Firm—Webster B. Harpman

[57] ABSTRACT

A tailgate conveyor for asphalt handling trucks and the like postions a main screw-type conveyor transversely of the tailgate of the truck for reception of material therefrom and provides a movable extension conveyor for operation on either end of the main conveyor so that material received in the main conveyor from the truck may be moved to either end thereof and into the movable extension conveyor and delivered to any desired position outwardly therefrom.

5 Claims, 3 Drawing Figures

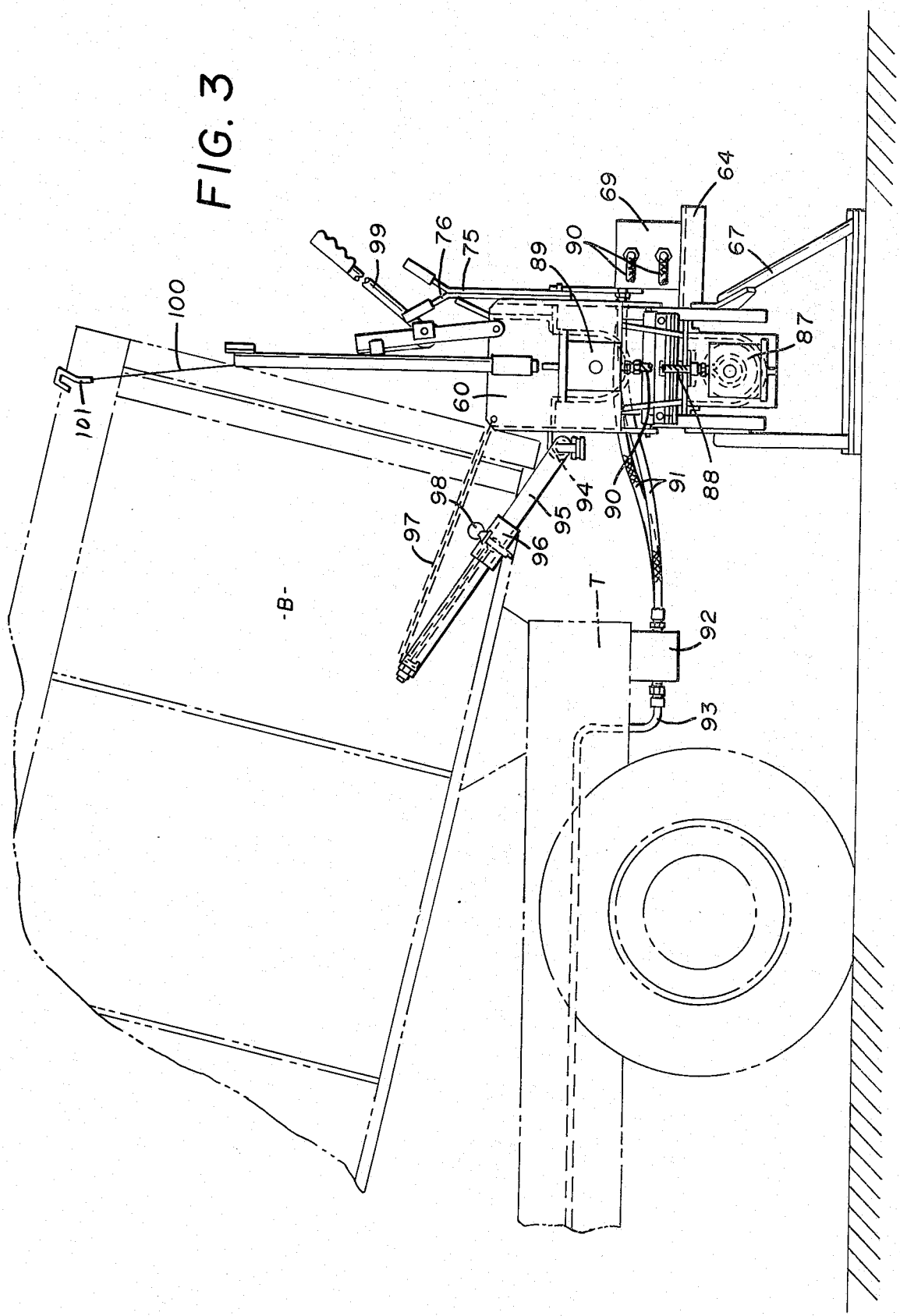

TAILGATE CONVEYOR

This is a continuation-in-part of my application, Ser. No. 289,631, filed Sept. 15, 1972, now U.S. Pat. No. 3,804,278.

BACKGROUND OF THE INVENTION

1. Field of the Invention

This invention relates to tailgate conveyor mechanisms of the type normally employed to receive material from a truck body and deliver it to one side thereof.

2. Description of the Prior Art

Prior structures of this type have utilized conveyors for receiving material from the truck and moving it to one side thereof and conveyor structures have been known in the art including extensions. See for example U.S. Pat. Nos. 2,834,451, 2,824,660, 2,490,212 and 2,419,824.

This invention provides for the interchangability of the extension conveyor from one side of the main conveyor to the other with the appropriate interconnection or relocation of the power means so that the device may be used to deliver asphaltic materials or the like to a remote point at either side of a truck having a tailgate conveyor attachment.

SUMMARY OF THE INVENTION

A tailgate conveyor comprises a principal conveyor positioned transversely with respect to a truck body and adjacent the tailgate thereof and provided with means for attachment to the truck body and the tailgate so as to be capable of being moved along with the truck and operated during such movement. An extension conveyor is attachable at either end of the main conveyor and movable to various positions so as to discharge the material at a remote point with respect to the main conveyor.

DESCRIPTION OF THE DRAWINGS

FIG. 3 is an end elevation on line 3—3 of FIG. 2 with broken lines indicating a portion of a dump truck.

DESCRIPTION OF THE PREFERRED EMBODIMENT

Figure 1:
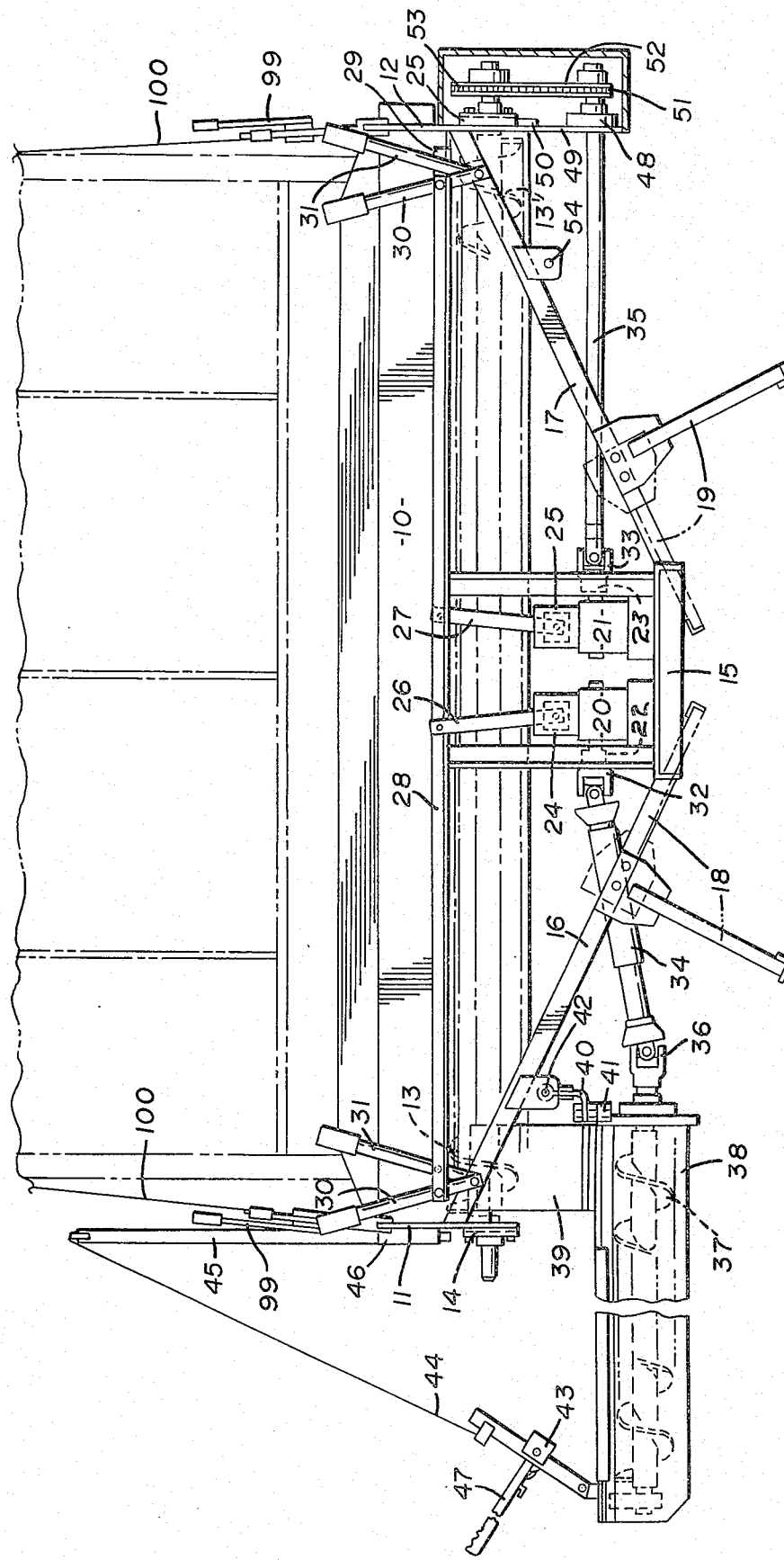
FIG. 1 is a front plan view of the tailgate conveyor with broken lines indicating the tailgate of a dump truck relative thereto.

In its simplest form the tailgate conveyor of this invention is comprised of a longitudinal open topped housing 10 with closed ends 11 and 12. A conveyor screw 13 is disposed longitudinally in the open topped housing 10 adjacent the lower portion thereof which is of a comparable curved configuration as will be understood by those skilled in the art and the ends of the conveyor screw 13 are rotatably positioned in journals 14 and 15 on the ends 11 and 12 respectively. A framework 15 is positioned midway between the ends of the open topped housing 10 and attached thereto and includes diagonal frame members 16 and 17 which extend therefrom in opposite directions to the ends 11 and 12 of the open topped housing 10. Foldable legs 18 and 19 are pivotally attached to the diagonal frame members 16 and 17 respectively and may be seen in ground engaging position in solid lines in FIG. 1 of the drawings and in elevated position in broken lines therein.

The frame 15 supports a pair of hydraulic motors 20 and 21 each of which has a drive shaft 22 and 23 extending out of the opposite sides thereof. A pair of valves 24 and 25 are arranged to control the hydraulic motors 20 and 21 and the valves 24 and 25 are operated by levers 26 and 27, each of which is pivotally attached at its upper end to one of a pair of transversely extending actuating arms 28 and 29 which in turn have operating handles 30 and 31 pivotally engaging its opposite ends and located adjacent the opposite ends of the tailgate conveyor. The arrangement is such that when the hydraulic motors 20 and 21 are actuated motion is imparted to universal joint couplings 32 and 33 which are detachably connected with drive shafts 34 and 35.

The drive shaft 34 extends transversely to a second universal joint coupling 36 by means of which rotary motion is imparted to one end of a conveyor screw 37 in a trough-shaped extension conveyor body 38 which is arranged with one end thereof below one end of the open topped housing 10 so that it can communicate therewith by means of a chute 39 which is formed of flexible material. The end of the extension conveyor 38 adjacent the open topped housing 10 is supported by an L-shaped bracket 40 which is pivoted to a vertical pivot 41 on the extension conveyor and to a horizontal pivot 42 on the diagonal frame 16 of the tailgate conveyor.

The extension conveyor 38 is thereby capable of receiving material from the main conveyor screw 13 and at the same time being moved upwardly and downwardly and in an arcuate motion forwardly and backwardly by reason of its pivotal attachment hereinbefore described. The outer end of the extension conveyor 38 has a hand operated winch 43 attached thereto with a cable 44 on the winch extending upwardly to a point of attachment at the upper end of a mast 45 which in turn is positioned in a socket 46 on the end 11 of the open topped housing of the tailgate conveyor. The winch 43 includes an actuating handle 47.

The drive shaft 35 extends in the opposite direction from the hydraulic motor 21 and more specifically the coupling 33 to a journal 48 on a support plate 49 which is provided with offset attachment arms 50 which are releasably secured to the fasteners mounting the journal 15 to the end 12 of the open topped housing 10. A gear 51 on the shaft 35 is connected by a chain 52 with a gear 53 on the end of the shaft comprising the journeled extension of the main conveyor screw 13 heretofore referred to.

Those skilled in the art will observe that the structure is such that it can be disassembled readily so as to free the support plate 49 and permit the repositioning of the drive shaft 35.

As shown in FIG. 1 of the drawings, rotary motion from the hydraulic motors 20 and 21 is conveyed by way of the drive shafts 34 and 35 and will thus simultaneously operate the main conveyor screw 13 of the tailgate conveyor and the extension screw 37.

It will occur to those skilled in the art that it may frequently be desirable to deliver asphaltic material or the like from the truck body and the tailgate conveyor specifically to the opposite side from that illustrated in FIG. 1 of the drawings and it will be seen that this is readily accomplished by moving the conveyor extension 38 to the opposite end of the tailgate conveyor and attaching it thereto on a horizontal pivot 54. So that the main conveyor screw 13 in the open topped housing 10 may be powered, the drive shaft 35 is disconnected and relocated on the left side of the machine and attached to the coupling 32 with its outer end journeled in the bearing 48 which is mounted on the mounting plate 49 which is also removed from the opposite end of the machine where it was illustrated in FIG. 1 of the drawings. The gears 51 and 53 and the connecting chain 52 are also removed from the right end of the device as seen in FIG. 1 of the drawings and repositioned on the left end, and rotary motion from the hydraulic motor 20 will be conveyed by the relocated drive shaft 35 to the opposite end of the main conveyor screw 13 which will accordingly be rotated in reverse direction as compared with its direction of rotation in FIG. 1 of the drawings.

The drive shaft 34 is also relocated from the position shown in FIG. 1 of the drawings to the right side of the machine and coupled to the coupling 33 and the coupling 36 of the extension conveyor 38, the extension conveyor 38 is held by the cable 44 with its winch 43 and attached to the tailgate conveyor by the mast 45 all of which are relocated along with the extension conveyor 38 as will be readily understood by those skilled in the art.

In such relocated position the machine will operate to deliver material from the truck via the open topped housing 10 of the tailgate conveyor to the right thereof through the extension conveyor 38.

Figure 2:
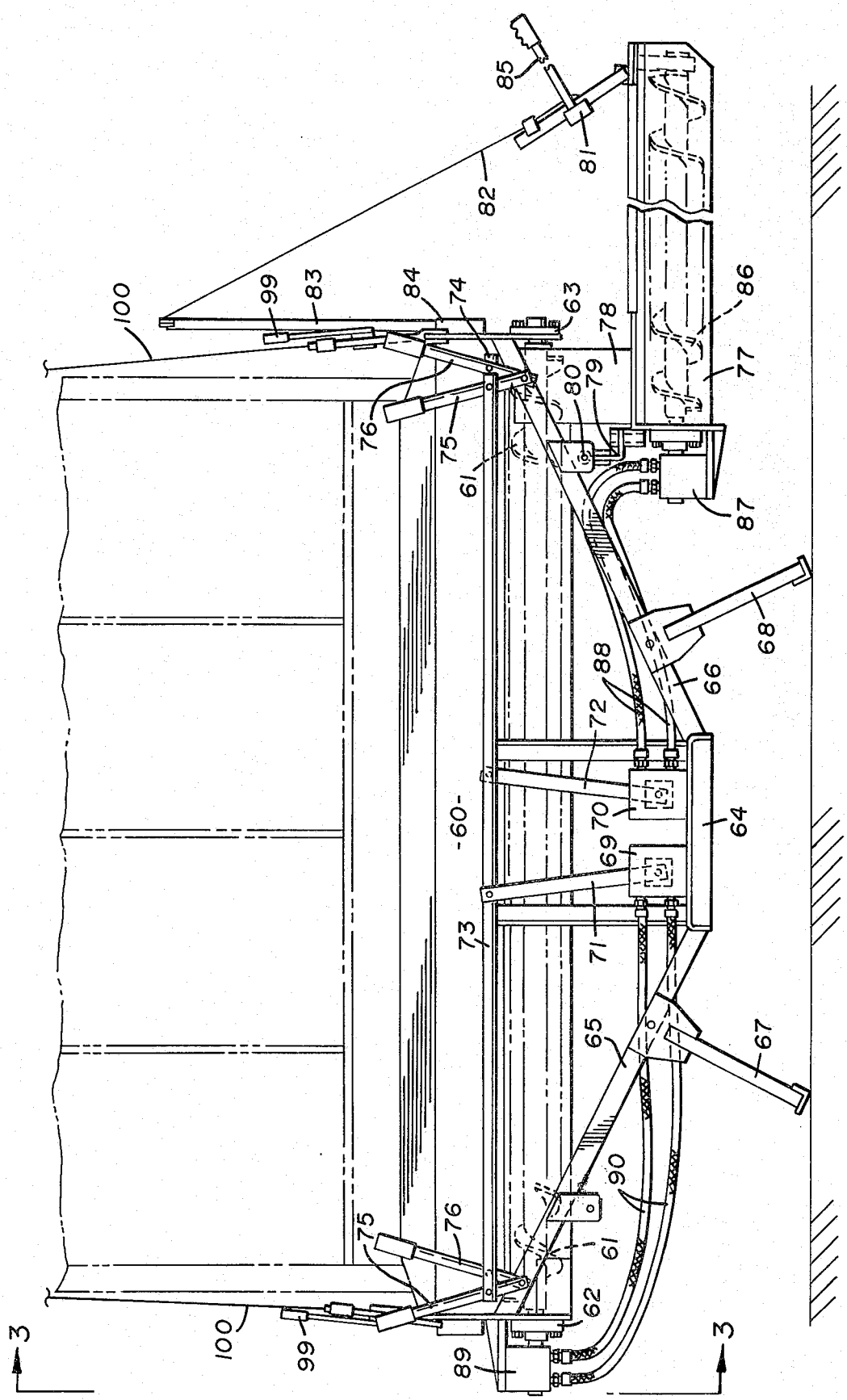
FIG. 2 is a front plan view of the conveyor with broken lines indicating a portion of a dump truck body and illustrating a modification of the power means.

It will occur to those skilled in the art that modifications may be made in the tailgate conveyor disclosed herein and particularly in the drive means thereof and by referring to FIG. 2 of the drawings a desirable modification may be seen in that a tailgate conveyor having an open topped housing 60 has a main conveyor screw 61 positioned therein and journeled at its opposite ends in journels 62 and 63 respectively. A framework 64 is positioned midway between the ends of the open topped housing 60 and attached thereto and includes diagonal frame members 65 and 66 which extend therefrom in opposite direction to the ends of the open topped housing 60. Foldable legs 67 and 68 are attached to the diagonal frame members 65 and 66 respectively and are illustrated in ground engaging position.

The frame 64 supports a pair of hydraulic control valves 69 and 70 which are provided with control levers 71 and 72 which extend upwardly therefrom and are pivoted at their upper ends to one of a pair of transversely extending actuating arms 73 and 74 respectively. Operating handles 75 and 76 pivotally engage the opposite ends of the arms 73 and 74 and are pivoted to the opposite ends of the tailgate conveyor so that the valves 69 and 70 can be operated from either side of the machine.

A trough-shaped extension conveyor body 77 is arranged with one end thereof below one end of the open topped housing 60 so that it can communicate therewith by means of a chute 78 which is formed of flexible material. The end of the extension conveyor 77 adjacent the open topped housing 60 is supported by an L-shaped bracket 79 pivoted to a horizontal pivot 80 on the diagonal frame 66 of the tailgate conveyor. The extension conveyor 77 is capable of receiving material from the main conveyor screw 61 and at the same time being moved upwardly and downwardly and in an arcuate motion forwardly and backwardly by reason of its pivotal attachment hereinbefore described. The outer end of the extension conveyor 77 has a hand operated winch 81 attached thereto with a cable 82 on the winch extending upwardly to a point of attachment at the upper end of a mast 83 which in turn is positioned in a socket 84 on the end of the open topped housing 60. The winch 81 has an operating handle 85.

The extension conveyor 77 has a conveyor screw 86 therein driven by a hyraulic motor 87 which is carried on one end of the extension conveyor 77 and connected with the hydaulic control valve 70 by a pair of flexible hoses 88.

The conveyor screw 61 in the open topped housing 60 is driven by a hydraulic motor 89 which is connected with the hydraulic control valve 69 by a pair of flexible hoses 90. Both hydraulic control valves 69 and 70 are provided with flexible hoses extending therefrom to a point of connection with a vehicle such as a dump truck and connected with the hydraulic fluid pressure system thereof and as illustrated in FIG. 3 of the drawings.

By referring to FIG. 3 of the drawings, it will be seen that the valves 69 and 70 are connected by flexible hoses 91 to a terminal connection block 92 on a truck frame T and that tubular communication lines 93 extend from the connection block 92 to the hydraulic system of the truck T, not shown.

In FIG. 3 of the drawings a side view of a portion of the dump truck body B may be seen and those skilled in the art will observe that a tailgate conveyor to be operative when a truck supplying it with material is moving, must be attached to the truck as well as supported thereby. The present invention provides novel means for such attachment and support and by referring to FIG. 3 of the drawings in particular it will be seen that the attachment means comprises transversely extending members 94 attached to the back of the open topped housing 60 and the frame 64. The members 94 are provided with projecting arms 95 and these in turn are provided with adjustable brackets 96 slidable thereon and incorporating means for engagement with the opposite sides of the dump truck body B as seen in broken lines in FIG. 3 of the drawings. The members 94 are movable transversely of the machine.

By referring to FIGS. 2 and 3 of the drawings it will be seen that chains 97 are attached to the ends of the open topped housing 60 and extend to the outer ends of the arms 95 and then inwardly thereof to engage pins 98 positioned through the brackets 96 respectively whereby the arms 95 are held in desired position.

Those skilled in the art will observe that it will be necessary to support the tailgate conveyor with respect to the truck body so that it can be maintained in operating position thereon when the truck is moving, as for example when asphaltic material is being received therefrom by the tailgate conveyor and delivered to a curb forming machine or the like operating in spaced relation to the truck and the supply of asphaltic concrete necessary.

In FIGS. 2 and 3 of the drawings, winches 99 are shown attached to the ends of the open topped housing 60 and attached to cables 100 which are provided with hooks 101 on their opposite ends. The hooks 101 are adapted to be positioned over the upper side or end walls of the truck body B as seen in FIG. 3 of the drawings and operation of the winches 99 will thereby lift the tailgate conveyor vertically while it is held in desirable position by the arms 95 and their attachment heretofore described.

It will thus be seen that the invention disclosed herein includes a novel, flexible and efficient power means in the arrangement and use of the hydraulic motors and their remotely operated control valves. The machine utilizes the power source of the dump truck with which the machine is used and avoids the heretofore common dependence on a separate power source such as an internal combustion engine.

The dual hydraulic motors 20 and 21 and 69 and 70 respectively enable the delivery speed of each of tailgate conveyors disclosed herein to be varied to match any desired delivery rate. For example when the machine is conveying material from a dump truck to a curb building machine the main conveyor screw can be operated at one speed and the extension conveyor screw at another or alternately stopped and started to maintain a desired supply of material to the curb building machine.

Although but two embodiments of the present invention have been illustrated and described it will be apparent to those skilled in the art that various changes and modifications may be made therein without departing from the spirit of the invention.

I claim:

1. A tailgate conveyor for attachment to a dump truck and consisting of a framework, a first open topped housing on said framework with an elongated screw therein arranged for delivery of material at either end, an extension conveyor consisting of a secondary open topped housing having a secondary elongated screw therein, means for removably attaching said secondary open topped housing to said framework at either end thereof and partially below one end of said first housing so as to permit relocation of said extension conveyor to either end of said framework, means for adjustably supporting said extension conveyor relative to said first open topped housing, means for driving said conveyors including a pair of hydraulic motors, drive shafts removably connecting said screws and said hydraulic motors, means establishing communication between said hydraulic motors and a remote soure of fluid pressure, valves in said communication means arranged to control said hydraulic motors and levers on said valves for actuating the same and means on said tailgate conveyor for engaging said dump truck and aligning said first open topped housing therewith, said means for engaging said dump truck including members movable longitudinally of said first open topped housing, arms on said members at right angles thereto and means on said arms for engaging the opposite sides of said dump truck.

2. The tailgate conveyor of claim 1 and wherein one of said hydraulic motors and one of said drive shafts is directly attached to said elongated screw in said first open topped housing and the other hydraulic motor and drive shaft is directly attached to said secondary elongated screw in said secondary open topped housing.

3. The tailgate conveyor of claim 1 and wherein said means establishing communication between said hydraulic motors and said remote source of fluid pressure include flexible hoses and couplings and a terminal connection on said dump truck.

4. The tailgate conveyor of claim 1 and wherein said valves are arranged to provide individual control of each of said hydraulic motors so that their speeds can be varied relative to one another.

5. The tailgate conveyor of claim 2 and wherein the drive shafts and the screws are integral constructions.

* * * * *